(No Model.)

F. R. SURFLEET, Dec'd.
J. A. Dutch, Administratrix.
VELOCIPEDE.

No. 421,068. Patented Feb. 11, 1890.

WITNESSES:
Alfred Gartner
E. L. Sherman

INVENTOR:
Francis R. Surfleet,
per Julia A. Dutch, Adm$^{rx}$
BY Drakes&Co ATTY'S.

UNITED STATES PATENT OFFICE.

JULIA A. DUTCH, OF NEWARK, NEW JERSEY, ADMINISTRATRIX OF FRANCIS R. SURFLEET, DECEASED.

VELOCIPEDE.

SPECIFICATION forming part of Letters Patent No. 421,068, dated February 11, 1890.

Application filed January 26, 1889. Serial No. 297,704. (No model.)

*To all whom it may concern:*

Be it known that FRANCIS R. SURFLEET, deceased, late of Hudson, Columbia county, New York, and a citizen of the United States, did invent certain new and useful Improvements in Velocipedes, as declared by me, JULIA A. DUTCH, of Newark, New Jersey, administratrix of the estate of the said SURFLEET; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to maintain a more continuous and uniform motion to a velocipede and obtain a given speed with less power than in velocipedes as ordinarily constructed.

The invention consists in the improved velocipede and the combination and arrangements of parts thereof, substantially as hereinafter set forth, and finally embodied in the claims.

Figure 1:
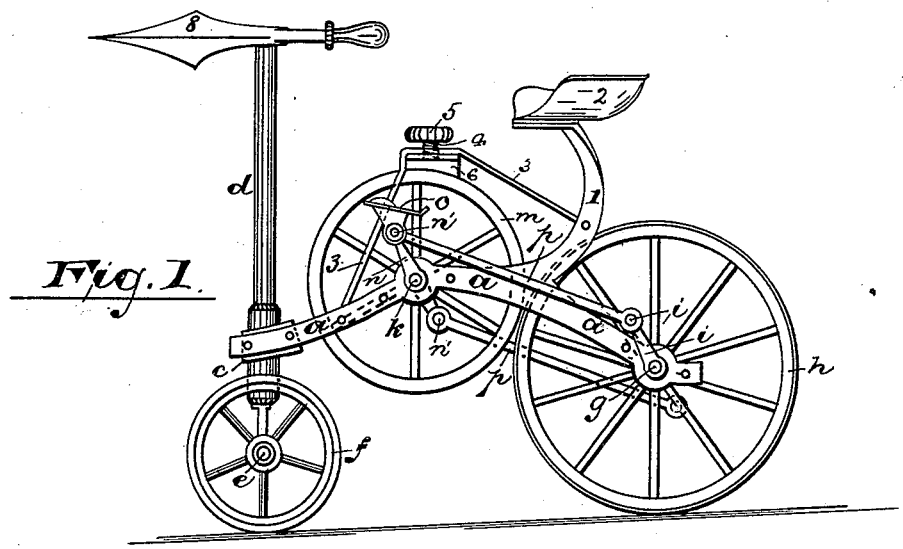
Figure 2:
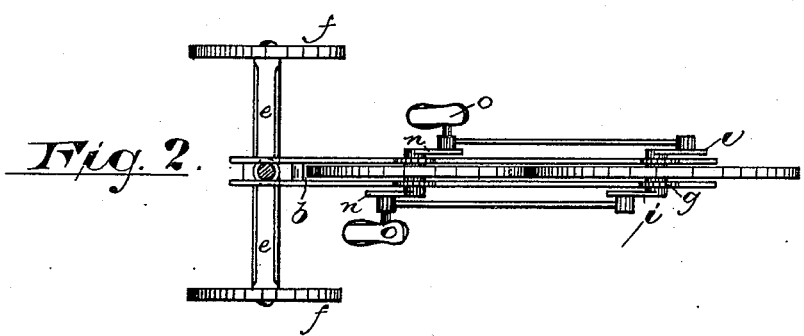

Referring to the accompanying drawings, in which like letters of reference indicate similar parts in each of the several figures, Figure 1 is a side elevation of a velocipede embodying the improvement; and Fig. 2 is a top plan view of the same with the seat, brake, and lever removed.

In the drawings, $a$ represents the frame of a velocipede, and slotted, as shown at $b$, Fig. 2. In the forward end of the frame are secured bearings $c$, in which is supported and turns a vertical standard or guide $d$. To the lower end of this standard is rigidly secured in any desired manner an axle or shaft $e$, having upon its ends journals or bearings, on which rotate wheels $f f$.

In the rear end of the frame $a$ are fitted bearings, in which rotates a shaft $a$, carrying a rear driving-wheel $h$. To the ends of the shaft $g$ are rigidly secured cranks $i$ $i$ with crank-pins $i'$.

$k$ is a shaft rotating in bearings secured to the frame $a$, and to which is secured a balance-wheel $m$. On the ends of the shaft $k$ are rigidly secured cranks $n$ $n$ with crank-pins $n'$. Upon these crank-pins $n$ $n$ are pivoted foot-rests $o$ $o$. The cranks $i$ $n$ are connected together by rods $p$ $p$.

From the top of the frame $a$ extends an arm 1, carrying a seat 2, and 3 is a spring-band connected at one end to the arm 4 and extending forward over and above the balance-wheel and then downward and connected at its lower end to the frame, as shown in Fig. 1. In the upper part of this spring-band is a threaded hole, in which a threaded bolt 4, provided with an operating wheel or lever 5 at its upper end and at its lower end pivotally secured to a brake or shoe 6.

Upon the top of the standard or guide $d$ is secured a handle or lever 8 for turning the axle with the forward wheels and guide them in any direction desired.

A velocipede constructed in the manner herein described can employ a larger driving-wheel in the rear than when two driving-wheels are used, and it can be propelled with much less power, as the power is primarily applied to a balance-wheel, which keeps up a more continuous motion when the wheels are passing over obstacles in the road.

It will be observed that the cranks which carry the foot-treadles are located well above the horizontal plane of the axle of the rear driving-wheel and approximately midway between the front and rear wheels, which enables, if desirable, a comparatively large balance-wheel to be connected with said cranks to secure steadiness of motion, &c., and to avoid the liability of said cranks or balance-wheel coming in contact with any ordinary obstructions which are liable to be met with in the roads.

It is not intended to limit the invention to the use of a balance-wheel, as shown, as it can be dispensed with, and the cranks $n$ $n$ can be pivoted directly to the frame, as will be manifest.

Having thus described the invention, what is claimed as new, and desired to be secured by Letters Patent, is—

1. In a tricycle, the combination, with the frame and forward supporting-wheels and rear driving-wheels, of a balance-wheel pivoted in said frame, a brake adapted to bear on said balance-wheel, foot-rests, and rods connecting said balance-wheel with said driving-wheel, as and for the purpose set forth.

2. In a tricycle, the combination, with the frame and forward supporting-wheels and rear driving-wheel, of a balance-wheel pivoted in said frame, foot-rests, and rods connecting said balance-wheel with said driving-wheel, as and for the purpose set forth.

3. The combination, in a tricycle provided with a rear driving-wheel having its bearing in the frame of the vehicle and carrying cranks, two smaller forward supporting or guide wheels mounted upon a suitable axle, and means for guiding the same, of cranks pivotally mounted upon said frame above a horizontal line drawn through the axle of the driving-wheel and between said driving-wheel and forward guide-wheels, foot rests or treadles pivotally connected with said cranks, and connecting-rods pivotally connected with said cranks and also with the cranks of the said driving-wheel, said parts being arranged in relation to one another and operating substantially as and for the purposes set forth.

In testimony that he claimed the foregoing I have hereunto set my hand this 8th day of January, 1889.

JULIA A. DUTCH,
*Administratrix of Francis R. Surfleet, deceased.*

Witnesses:
OLIVER DRAKE,
E. L. SHERMAN.